July 9, 1963
M. MAYRATH
3,096,872
CARRIAGE FOR ELEVATORS
Filed June 21, 1961
2 Sheets-Sheet 1
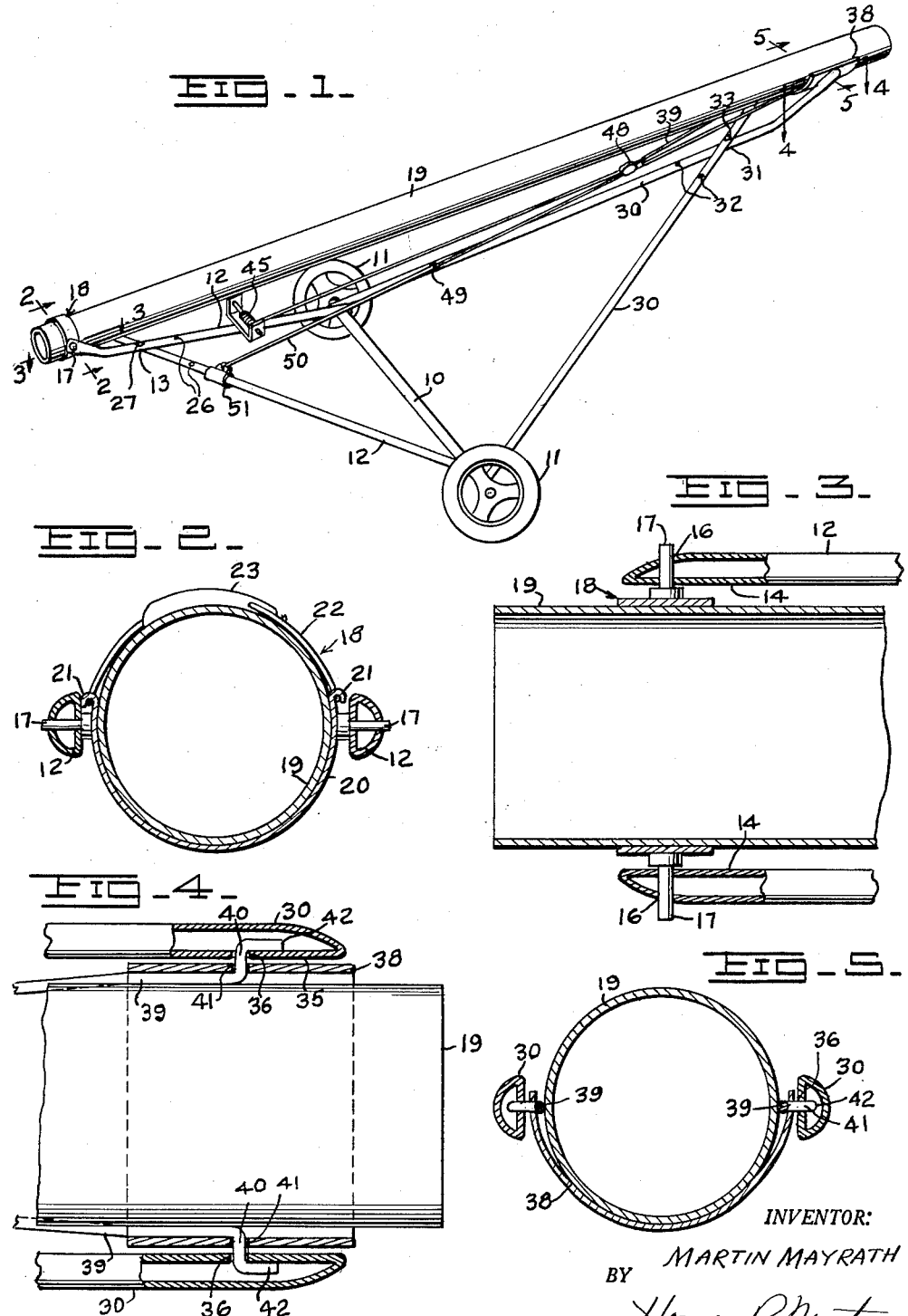
INVENTOR:
MARTIN MAYRATH
BY
Homer P. Montague
atty.

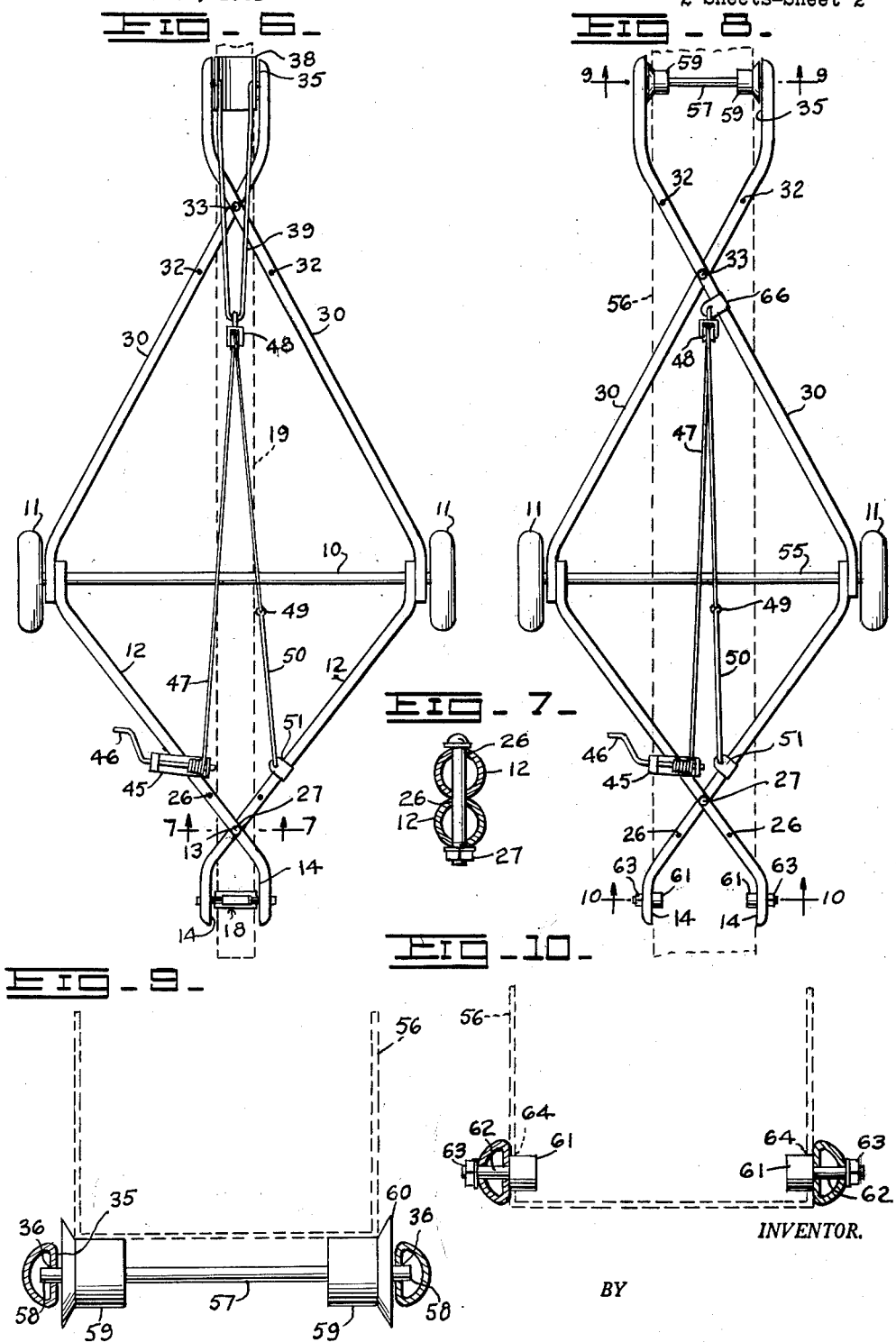

United States Patent Office 3,096,872
Patented July 9, 1963

3,096,872
CARRIAGE FOR ELEVATORS
Martin Mayrath, 10707 Lennox Lane, Dallas, Tex.
Filed June 21, 1961, Ser. No. 118,646
9 Claims. (Cl. 198—120.5)

This invention relates to a carriage for corn and hay elevators and the like, and has particular reference to a wheeled carriage, movable wherever desired, for supporting devices of the type referred to.

It is the common practice to provide wheeled carriages for supporting such mechanisms as auger conveyors, hay elevators and the like, the carriage being provided with a wheeled axle, radius rods projecting from such axle to one end of the mechanism being supported, and supporting arms extending from the axle to the other end of the mechanism. Conventionally, the radius rods are slidable or otherwise movable longitudinally of the conveyor so that the angle between the radius rods and supporting arms may be varied to adjust the angle to the horizontal of the conveyor and hence the height of the discharge point. It is the common practice to provide different carriages of this general type to support a mechanism such as an auger conveyor or to support a hay bale elevator, but a single carriage has not been adapted to support either of such mechanisms.

An important object of the present invention is to provide a carriage of the type referred to which is subject to quick adjustment to adapt it to support any one of several mechanisms such as an auger conveyor or a hay bale elevator.

A further object is to provide a device of this character which is actually simpler and more rugged in construction than conventional carriages adapted to support only one type of mechanism.

A further object is to provide a carriage of this type wherein the radius rods and supporting arms are crossed at points spaced from the axle and are fixed in position by a single bolt passing through the crossing point of the radius rods and a single bolt passing through the crossing point of the supporting arms.

A further object is to provide the radius rods and supporting arms of the carriage structure with a plurality of bolt receiving openings adapted to be aligned at the crossing points of the radius rods and supporting arms, thus providing simple means for adjusting the space between the free ends of the radius rods and supporting arms to adapt them to support a variety of mechanisms.

Other objects and advantages of the invention will become apparent during the course of the following description.

In the drawings I have shown two embodiments of the invention. In this showing:

FIGURE 1 is a perspective view of the carriage operatively supporting an auger conveyor tube;

FIGURE 2 is an enlarged detail section on line 2—2 of FIGURE 1;

FIGURE 3 is a similar view on line 3—3 of FIGURE 1;

FIGURE 4 is a similar view on line 4—4 of FIGURE 1;

FIGURE 5 is a similar view on line 5—5 of FIGURE 1;

FIGURE 6 is a plan view of the carriage adjusted for supporting an auger conveyor;

FIGURE 7 is an enlarged detail sectional view on line 7—7 of FIGURE 6;

FIGURE 8 is a similar view showing the carriage adjusted for supporting some other mechanism such as a troughed hay bale conveyor;

FIGURE 9 is an enlarged sectional view on line 9—9 of FIGURE 8; and

FIGURE 10 is a similar view on line 10—10 of FIGURE 8.

Referring to FIGURES 1-6, inclusive, the numeral 10 designates an axle structure provided at its ends with supporting wheels 11 to render the carriage transportable wherever desired. A pair of radius rods 12 are pivotally supported at one end with respect to the axle 10 and converge toward their forward ends and cross, for example at the point 13 in FIGURE 1. The free ends of the radius rods 12 are flattened as at 14, the flattening of the radius rods taking place incident to the shearing off of the ends thereof, it being understood that the radius rods are preferably tubular.

The flattened ends of the radius rods are apertured as at 16 to provide bearing openings to receive pivot pins 17 carried by a clamp indicated as a whole by the numeral 18 and surrounding the forward end of an auger conveyor tube 19. The clamp 18 may be of any desired type forming no part of the present invention, for example as shown in FIGURE 2. The clamp is illustrated as comprising a substantially semicircular band 20 connected at its ends as at 21 to curved wires 22 adapted to be pulled together by an overcenter operating handle 23. Obviously the ends 17 prevent movement of the ends of the radius rods 12 longitudinally of the conveyor tube 19.

One of the features of the invention lies in the simplicity and rigidness of the radius rods and supporting arms to be described. It will be noted that each radius rod 12 is provided with a plurality of openings 26 therethrough, these openings being adapted to be aligned selectively at the crossing point 13 to receive a bolt 27 (FIGURE 7) to fix the radius rods with respect to each other. This crossing of the radius rods eliminates the conventional cross bars connected between the radius rods and makes a triangular arrangement of parts of the axle 10 and radius rods 12 up to the crossing point 13 whereby the radius rods are provided in an extremely simple manner with a high degree of rigidity. This means for fixing the radius rods to each other, as further described below, also adapts the carriage structure for adjustment to support mechanisms other than auger conveyor tubes.

The carriage further comprises a pair of supporting arms 30 pivotally connected at one end to the axle 10. The supporting arms 30 also cross, for example at the point 31, and selective pairs of openings 32, depending upon the use of the carriage, are arranged to be secured together by a bolt 33. Here again, a rigid triangular arrangement of parts is provided which strengthens the supporting arm structure without cross members, and the arrangement permits the adjustment of the carriage for supporting various types of mechanisms as stated above. The connection of the supporting arms 30 at the cross point 31 is the same as the crossing points of the radius rods 12 as shown in FIGURE 7.

The supporting arms 30 are also tubular and are sheared off at their free ends, and in so doing, the inner face of each arm 12 is flattened as at 35. It will be noted that the arrangement of parts is such that the flattened faces 14 are parallel to each other and the same is true of the flattened faces 35. This parallelism of the flattened faces of the radius rods and supporting arms is maintained in any adjustment of the parts, as will become apparent.

The flattened face portion of each supporting arm 30 is provided with an opening 36 forming a pivot opening for a purpose to be described. It will be noted that both sides of each arm 30 are not pierced as is true of the radius rods 12 (FIGURE 3).

A substantially semicircular support 38 for the tube 19 is provided between the free ends of the supporting arms 30. This support is fixed with respect to the arms 30 by means of a bail 39 having portions 40 adjacent the ends thereof bent outwardly to extend through openings 41 in the support 38 and through the openings 36, the extremities of the arms of the bail being bent as at 42 parallel to the adjacent face 35. The auger tube 19 is adapted to rest in the support 38 (FIGURE 5) and the supports 38 is slidable along the conveyor tube 19 to vary the elevation of the upper end of such tube.

Any suitable means may be employed for pulling the remote ends of the radius rods and supporting arms toward each other to vary the angle between such members to adjust the height of the upper end of the conveyor tube 19. For example, a winch 45 may be secured to one of the radius rods 12 at any suitable point and provided with a conventional ratchet mechanism (not shown) for holding it against rotation. The winch is adapted to be turned by a handle 46 to wind thereon a cable 47. This cable passes around a pulley 48 connected to the bail 39 and the other end of the cable 47 is connected as at 49 to a rod 50 connected as at 51 preferably to the radius rod 12 opposite the winch 45. The rod 50 is preferably employed to limit the upward swinging movement of the radius rods and arms at the point where the pulley 48 comes in contact with the rod 50, thus eliminating any chance that the free ends of the supporting arms 30 may fall over to the side of the axle 10 opposite the normal positions of the supporting arms.

It will be noted that the free ends of the radius rods and supporting arms are arranged relatively close together in FIGURE 6 for the purpose of supporting the conveyor tube 19. The axle 10 is selected as to length according to the adjustment of the radius rods and supporting arms. Where a wider mechanism such as a trough conveyor is to be supported, a shorter axle 55 is selected as in FIGURE 8. It also will be noted in FIGURE 6 that the bolts 27 and 33 are arranged in the openings 26 and 32 respectively nearest the free ends of the radius rods and supporting arms. Where a wider mechanism is to be supported by the carriage, the bolts 27 and 33 are removed and the opposite radius rods and supporting arms are moved toward each other to aline another pair of openings 26 and 32, whereupon the bolts 27 and 33 are inserted in another pair of bolt receiving openings.

The radius rods and supporting arms are thus adjustable to change the spacing between the free ends thereof, as will be readily apparent from a comparison of FIGURES 6 and 8. In the latter case, the carriage is adapted to support another mechanism, for example the trough 56 of a hay bale conveyor as shown in dotted lines in FIGURES 8, 9 and 10. In such case, a shaft 57 (FIGURES 8 and 9) extends between the free ends of the supporting arms 30, and the shaft has its ends 58 projecting through the openings 36 previously described and shown in FIGURE 4. The shaft 57 carries wheels 59 to support the trough 56, the wheels being flanged as at 60 to act as a guide for the trough 56.

In the case of a trough conveyor, for example, the clamping band 18 of course will not be used. In this case, short pipe sections 61 may be connected in any suitable manner to bolts 62 projecting through the openings 16 (FIGURE 3) of the free ends of the radius rods, the bolts being fixed in position by nuts 63. The members 61 form pivotal supports for the conveyor trough and project through openings 64 in opposite sides of the trough.

In the absence of the bail 39 previously described, when the invention is used as in FIGURE 8, the pulley 48 may be pivoted to a bracket 66 carried by one of the supporting arms 30.

*Operation*

Where the carriage is to be used to support a mechanism such as an auger conveyor, the clamp 18 is placed in position around the tube 19 and the pins 17 are inserted through the openings 16 prior to the securing of the bolt 27 in position. Before the application of such bolt, the free ends of the radius rods are movable toward each other to engage the pins 17. The bolt 27 is then inserted through the selected openings 26 and secured in position as shown in FIGURE 7.

Prior to the placing of the bolt 33 in position, the free ends of the supporting arms are suitably separated and the arms of the bail 39 are flexed for insertion of the ends 42 (FIGURE 4) through the openings 41 and 36. The bolt 33 is then applied through the selected openings 32. With the cable 50 connected as shown in FIGURE 6, and with the tube 19 fixed in the band 18 and resting in the support or saddle 38, the winch 45 may be operated to raise the free ends of the supporting arms 13 to adjust the discharge end of the conveyor tube 19 to the desired height.

When the carriage is to support a wider mechanism such as a trough conveyor, and with the bolts 27 and 33 removed, the axle 55, shorter in length, is substituted for the axle 10 and the free ends of the supporting arms are separated far enough for the insertion of the shaft ends 58 in the openings 36 (FIGURE 9). The proper set of bolt receiving openings 32 is then alined and the bolt 33 applied therethrough, as will be apparent. Similarly, prior to the insertion of the bolt 27, the free ends of the radius rods are separated sufficiently for the insertion of the pivot members 61 through the openings 64. The free ends of the radius rods are moved together to aline the proper set of openings 26, whereupon the bolt 27 is applied. The adjustment of the height of the discharge end of the conveyor in the modified form of the invention is similar to the previously described adjustment. The free ends of the radius rods are fixed against movement longitudinally of the conveyor, but the conveyor trough is movable on the rollers 59. Thus the which are readily adjustable to support different types of of the supporting arms 30 to adjust the height of the discharge end of the conveyor.

From the foregoing it will be apparent that the present construction not only is very simple in design but is more rugged than conventional arrangements. The single bolts 27 and 33 provide the radius rod and supporting arm structures with a high degree of rigidity, and the bolts being relatively close to the free ends of the radius rods and supporting arms, it will be apparent that the latter will be held in position properly with respect to the elements which they support. In addition to its advantages of simplicity and ruggedness, the carriage provides elements which are readily adjustable to support different types of conveyors or other structures.

It is to be understood that the forms of the invention shown and described are to be taken as preferred examples of the same and that various changes in the shape, size, and arrangement of the parts may be made as do not depart from the spirit of the invention or the scope of the appended claims.

What is claimed is:

1. A carriage for conveyors and like mechanisms comprising a wheeled axle assembly, a pair of radius rods connected at one end to said axle assembly, a pair of supporting arms connected at one end to said axle assembly and projecting therefrom at the side opposite said radius rods, said radius rods converging from said axle assembly and crossing at a point spaced from the other ends thereof, said supporting arms converging from said axle assembly and crossing at a point spaced from their other ends, said radius rods and said supporting arms having openings punched therethrough in corresponding pairs adapted to be brought into registration selectively to predetermine the distance between said other ends of said radius rods and said supporting arms, and single fastening elements passing through alined openings in said radius rods and said supporting arms, said other ends of said radius rods and said supporting arms having means for supporting with respect thereto a selected mechanism.

2. A carriage for conveyors and like mechanisms comprising a wheeled axle assembly, a pair of radius rods connected at one end to said axle assembly, a pair of supporting arms connected at one end to said axle assembly and projecting therefrom at the side opposite said radius rods, said radius rods converging from said axle assembly and crossing at a point spaced from the other ends thereof, said supporting arms converging from said axle assembly and crossing at a point spaced from their other ends, said other ends of said radius rods and said supporting arms being straight and parallel to each other, said radius rods and said supporting arms having openings punched therethrough in corresponding pairs adapted to be brought into registration selectively to predetermine the distance between said other ends of said radius rods and said supporting arms, and single fastening elements passing through alined openings in said radius rods and said supporting arms, said straight ends of said radius rods and said supporting arms having means for supporting therebetween a selected mechanism.

3. A carriage for conveyors and like mechanisms comprising a wheeled axle assembly, a pair of radius rods connected at one end to said axle assembly, a pair of supporting arms connected at one end to said axle assembly and projecting therefrom at the side opposite said radius rods, said rods converging from said axle assembly and crossing at a point spaced from the other ends thereof, said supporting arms converging from said axle assembly and crossing at a point spaced from their other ends, said other ends of said radius rods and said supporting arms being straight and parallel to each other, said radius rods and said supporting arms having openings punched therethrough in corresponding pairs adapted to be brought into registration selectively to predetermine the distance between said other ends of said radius rods and said supporting arms, and single fastening elements passing through alined openings in said radius rods and said supporting arms, means for supporting a mechanism between said straight ends of said radius rods, such means fixing said straight ends of said radius rods against longitudinal movement relative to said mechanism, and means connected between said straight ends of said supporting arms for supporting an adjacent portion of said mechanism for movement relative to said supporting arms whereby said straight ends of said supporting arms are movable longitudinally relative to said mechanism to provide for varying the angularity between said radius rods and said supporting arms.

4. A carriage according to claim 3 wherein said means for supporting said mechanism relative to said straight ends of said supporting arms comprises a semicircular open topped saddle in which said mechanism is slidable, and means for pivotally connecting said saddle to said straight ends of said supporting arms.

5. A carriage according to claim 3 wherein said means for supporting said mechanism relative to said straight ends of said supporting arms comprises a semicircular open topped saddle in which said mechanism is slidable, a substantially V-shaped bail having arms the end portions of which extend outwardly through the sides of said saddle, said straight ends of said supporting arms having openings through which said ends of said bail project, and winch and cable means connected between said radius rods and said bail for exerting a pull on said radius rods and said supporting arms for varying the angle therebetween.

6. A carriage according to claim 3 wherein said supporting arms are tubular and are provided at the inner surfaces of said straight ends thereof with openings, said means for supporting said mechanism relative to said straight ends of said supporting arms comprising an axle having its ends projecting through said openings, and wheels carried by said axle.

7. A carriage for conveyors and like mechanisms comprising a wheeled axle assembly, a pair of radius rods connected at one end to said axle assembly, a pair of supporting arms connected at one end to said axle assembly and projecting therefrom at the side opposite said radius rods, said radius rods converging from said axle assembly and crossing at a point spaced from the other ends thereof, said supporting arms converging from said axle assembly and crossing at a point spaced from their other ends, pivotal means fastening together said radius rods to one another and said support arms to one another at their respective crossing locations, and means at the outermost ends of said radius rods and of said support arms for supporting with respect thereto a selected mechanism.

8. A carriage in accordance with claim 7, in which said pivotal means comprise bolts respectively passing through alined openings in the radius rods and in the supporting arms at their crossing locations.

9. A carriage in accordance with claim 7, in which the extremities of all said radius rods and said supporting arms are bent at angles so as to lie all in parallel planes with respect to one another.

References Cited in the file of this patent

UNITED STATES PATENTS 1,589,495      Wentz _____ June 22, 1926